United States Patent [19]

Hora

[11] Patent Number: 5,154,580
[45] Date of Patent: Oct. 13, 1992

[54] PROPELLER PITCH CHANGE MECHANISM

[75] Inventor: Petr Hora, West Chester, Ohio

[73] Assignee: General Electric Company, Cincinnati, Ohio

[21] Appl. No.: 556,688

[22] Filed: Jul. 23, 1990

[51] Int. Cl.$^5$ .......................................... B64C 11/48
[52] U.S. Cl. ................................. 416/129; 416/130; 416/160
[58] Field of Search ............... 416/128, 129, 130, 159, 416/160, 162, 170 R

[56] References Cited

U.S. PATENT DOCUMENTS

| | | |
|---|---|---|
| 2,541,636 | 2/1951 | Chillson . |
| 2,664,960 | 1/1954 | Longfellow . |
| 3,536,415 | 10/1970 | Kusiak . |
| 3,647,320 | 3/1972 | Chilman . |
| 3,672,788 | 6/1972 | Ellinger . |
| 3,866,415 | 2/1975 | Ciokajlo . |
| 3,893,789 | 7/1975 | Andrews . |
| 3,910,721 | 10/1975 | McMurtry . |
| 3,912,418 | 10/1975 | Andrews et al. . |
| 3,922,852 | 12/1975 | Drabek . |
| 3,964,839 | 6/1976 | Kusiak . |
| 3,994,128 | 11/1976 | Griswold, Jr. . |
| 4,047,842 | 9/1977 | Avena et al. . |
| 4,521,158 | 6/1985 | Fickelscher . |
| 4,534,524 | 8/1985 | Aldrich . |
| 4,657,484 | 4/1987 | Wakeman et al. . |
| 4,660,437 | 4/1987 | Scott . |
| 4,738,589 | 4/1988 | Wright .............................. 416/129 |
| 4,738,590 | 4/1988 | Butler . |
| 4,738,591 | 4/1988 | Butler . |
| 4,750,862 | 6/1988 | Barnes et al. . |

FOREIGN PATENT DOCUMENTS

| | | |
|---|---|---|
| 58-197499 | 11/1983 | Japan . |
| 531756 | 1/1941 | United Kingdom . |
| 1296063 | 11/1972 | United Kingdom . |
| 2182397 | 5/1987 | United Kingdom . |

OTHER PUBLICATIONS

Article—"A New Design for a Contra-Prop"-Aeronautical Engineering.

Primary Examiner—Edward K. Look
Assistant Examiner—James A. Larson
Attorney, Agent, or Firm—Jerome C. Squillaro; John R. Rafter

[57] ABSTRACT

The invention relates to pitch-change systems for aircraft propfans of the counterrotating type. The pitch of each propfan stage is independently adjustable. Further, in the case where one of the propfan stages acts as a rotating obstacle for a mechanism which causes pitch change of the other stage, a system is provided which transfers the pitch-change torque through this obstacle-stage without being affected by the speed of the obstacle-stage.

7 Claims, 13 Drawing Sheets

PROPELLER PITCH CHANGE MECHANISM

The invention relates to pitch change mechanisms for aircraft propellers and, more particularly, to such mechanisms for use with counter rotating propellers of the prop fan type.

BACKGROUND OF THE INVENTION

This application is related to U.S. patent application entitled "Torque Multiplier for Aircraft Propeller," to Hora et al., filed on Jul. 23, 1990, as Ser. No. 556,676, the disclosure of which is incorporated by reference.

FIG. 1 illustrates an aircraft 3 powered by counter rotating propellers 6 and 9. The propellers rotate in opposite directions as indicated by arrows 12 and 15. FIG. 2 illustrates a type of turbine system which can be used to drive the propellers 6 and 9. In FIG. 2, fore propeller 6 is attached to a first turbine 18 which is supported by bearings 21 and rotates in direction 12 indicated in FIG. 1. The components rotating in this direction are decorated with hatching in FIG. 2. The aft propeller blade 9 is fastened to a second turbine 24 which is supported by bearings 27 and rotates in direction 15 of FIG. 1. A hot, high energy gas stream 30 provided by a gas generator (not shown) causes rotation of the turbines.

Propellers 6 and 9 (which are sometimes called fans or propfans in the art) are of the variable pitch type. Variable pitch means that each blade can rotate about a respective pitch axis 6A or 9A in FIGS. 1 and 2 as indicated by circular arrows 33 and 36. A principal reason for changing pitch is to provide the blades 6 and 9 with the angle of attack which is proper for the present air speed of the aircraft and power level of the engine.

A problem arises with the configuration of FIG. 2 when one wishes to use a motor 38 supported by a stationary frame 37 in order to change pitch of the forward propeller 6. The problem is that frame 40 of the aft turbine 24 acts as a rotating obstacle which the mechanical forces which change pitch of propeller 6 must cross. That is, one cannot run a shaft from motor 38 as indicated by phantom shaft 42 because such a shaft would lock the two turbines 18 and 24 together and prevent relative rotation.

One approach to crossing this obstacle is given in U.S. Pat. No. 4,657,484, by Wakeman et al., entitled "Blade Pitch Varying Means," of which the General Electric Company is the Assignee, and which is hereby incorporated by reference. Part of this patent is shown in schematic, simplified form in FIG. 3. The reader is referred to the patent itself for precise detail.

In FIG. 3, pitch change is caused by two gear racks 84 and 86 which drive two pinions 82 and 68. The racks 84 and 86 slide left- and rightward on rails 58, 74, and 78. Rail 74 rides on carriage 59, which rides on rail 58. Rail 58 is supported by stationary frame 305, and does not move. However, rail 78 is supported by turbine 24, and rotates along with that turbine.

Rack 86 is driven as follows. A hydraulic piston 50 drives a rod 52 which moves a first inner bearing race left- and rightward, and which pulls a first outer bearing race 60 in the same direction, because of balls located between the races. The balls perform two functions: (1) they pull the outer race 60 along with the inner race 56, thereby forcing the outer race 60 to remain adjacent the inner race 56, and (2) the balls also allow the outer race 60 to rotate about axis 67, while the inner race 56 remains stationary.

The outer race 60 moves the rack 86 left- and rightward and this motion rotates the pinion 68, which rotates a shaft 109, which rotates aft propeller blade 9 in order to change pitch, as indicated by arrow 70. A second hydraulic piston 50A drives a second push rod 52A which moves a second inner bearing race 94 left- and and rightward. The second inner bearing race 94 pulls a second outer bearing race 92 in the same direction. The second outer race 92 moves a second rod 93 left- and rightward. The second rod 93 connects to a third inner race 96, the left- and rightward motion of which drives the second rack 84 left- and rightward through a third outer race 98, in order to change pitch of the fore blade 6.

Second outer race 92 and third inner race 96 are supported by turbine 24, as is second rod 93, and the three components rotate about axis 67. However, the third outer race 98 is carried by turbine 18, as is rack 84 and pinion 82, and these three components rotate along with turbine 18, in the opposite direction.

That is, third races 96 and 98 form a differential bearing: both races rotate in opposite directions. Such is not the case with races 92 and 94, nor with races 56 and 60.

Therefore, axial (ie, left- and rightward) motion of the piston rods 52 and 52A cause pitch change of respective blades 6 and 9, even though turbine 18 is nested within turbine 24. (The former turbine 18 is supported on bearings 321 and 324, while the latter turbine 24 is supported on bearings 308 and 311, and both turbines rotate in opposite directions.)

Five significant features of the arrangement of FIG. 3 are the following. One, as described, the pitches of blades 6 and 9 are independently adjustable. However, there is not true independence of pitch: for reasons which need not be understood by the reader, the system of FIG. 3 requires that the pitches of blades 6 and 9 remain within about 8 degrees of each other. Under some flight conditions, such as during reverse thrust applied after touch-down during landing, it can be required that the pitches of blades 6 and 9 differ by 8 degrees or more.

Two, there is a reversing axial load applied to the bearings associated, for example, with races 96 and 98. This reversing load is not desirable.

Three, the train of components located between the pistons 52 and 52A and the respective blades 6 and 9 possess a certain springiness, which is undesirable. That is, the system is not stiff.

Four, for reasons which need not be understood by the reader, the system of FIG. 3 was found to impose an undesirable travel limit on the total pitch excursion from the deepest negative pitch to the highest positive pitch.

Five, high dynamic loads were found to be imposed on the differential bearing comprising races 96 and 98.

Moreover, in some situations, the use of hydraulic components can be disadvantageous, and so a replacement for piston 50 may be sought.

OBJECTS OF THE INVENTION

It is an object of the present invention to provide an improved pitch change mechanism for aircraft propellers.

It is a further object of the present invention to provide a pitch change mechanism for aircraft propellers which can transmit pitch-changing torque to propeller blades which are supported by a pair of counter rotating turbines.

SUMMARY OF THE INVENTION

In one form of the invention, a pitch change mechanism for a counterrotating pair of aircraft propellers allows a user to apply independent pitch-change torques to each propeller. In another form of the invention, the counterrotating propellers are driven by counterrotating gas turbines. Since the turbines are fluidically coupled, they can rotate at independent speeds to some extent. A gear system carries pitch-changing torque from one turbine to the second turbine, yet maintains required pitch independently of speed changes between the turbines.

DETAILED DESCRIPTION OF THE INVENTION

A simplified form of the invention will first be described using a progression of schematic diagrams. Then, a detailed form of the invention will be explained.

FIG. 4: DRIVE GEAR 100 CHANGES PITCH

Figure 4:
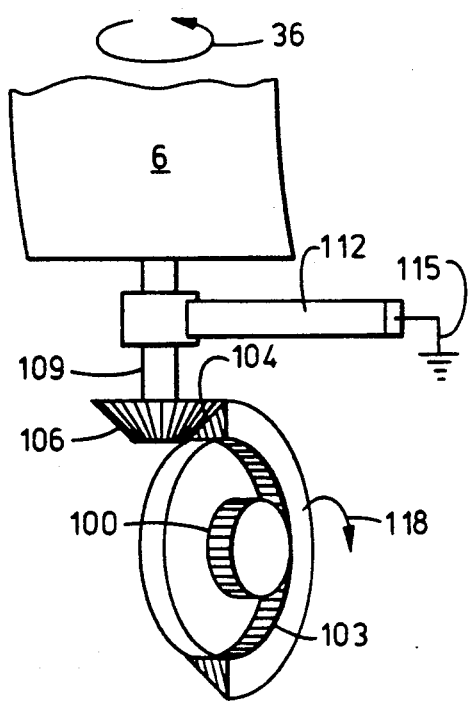
FIG. 4 illustrates a simplified gear train for changing pitch of a propeller.

In FIG. 4, a drive gear 100 rotates a movable ring gear 103, to which is attached a bevel ring gear 104 which engages a blade bevel gear 106 connected to a shaft 109 connected to a propeller blade 6. The shaft 109 is supported by a bracket 112 which is fixed in position, as indicated by ground symbol 115. (As will be later seen, the ground symbol 115 is analogous to turbine frame 18 in FIG. 2.)

Figure 5:
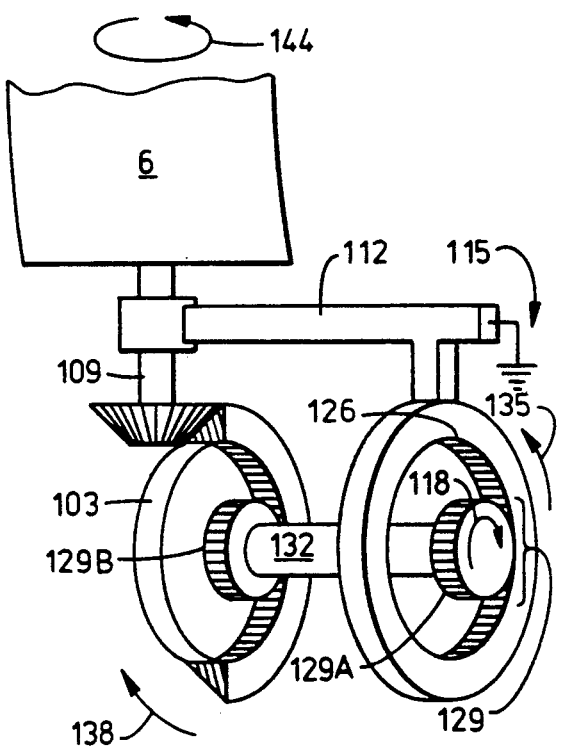
FIG. 5 illustrates a more complex gear train than that of FIG. 4, in which rotation of a planet gear 129 causes rotation of a movable ring gear 103 relative to a fixed ring gear 126.

The rotation of the drive gear 100, indicated by arrow 118, causes rotation, or pitch change, of the propeller blade 6, as indicated by arrow 36. A more complex mechanism of the type of FIG. 4 is shown in FIG. 5.

FIG. 5: PLANET GEAR 129 CHANGES PITCH

The bracket 112 is now affixed to a fixed ring gear 126 which does not rotate with respect to the shaft 109, as indicated by the ground symbol 115. Movable ring gear 103, which is free to rotate with respect to the fixed ring gear 126, is driven by a planet gear 129B. The planet gear 129B is part of a compound planet gear 129, which includes two sub-planets 129A and 129B which are connected by a shaft 132. The planets are rigidly connected to the shaft 132, and cannot move with respect to each other.

Rotation of planet gear 129 causes it to climb the fixed ring gear 126, in the direction of arrow 135. That is, in this climbing, the planet 129 orbits within the fixed ring gear 126 about the center of the fixed ring gear. This movement of the planet gear 129 causes relative rotation of the ring gear 103 with respect to the ring gear 126, and pitch change of the propeller blade 6, as indicated by arrows 138 and 144 respectively.

(Details concerning the reasons for this relative rotation are given in a section entitled "Technical Considerations," which is located near the end of the Specification. In brief, the relative rotation occurs because the gear ratio between sub-planet 129A and the fixed ring gear 126 is different than the gear ratio between sub-planet 129B and the movable ring gear 103.)

Figure 6:
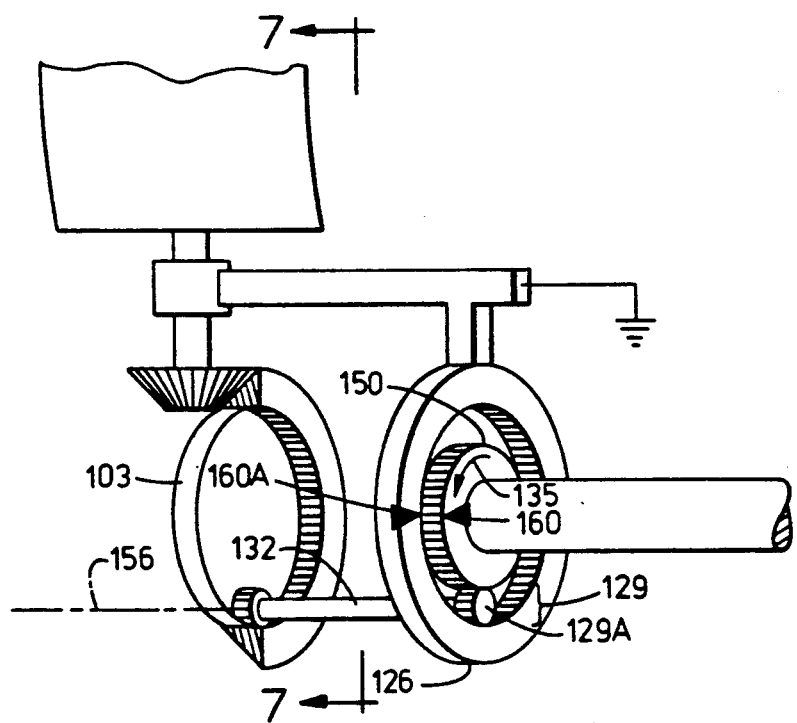
FIG. 6 illustrates a modification of the system of FIG. 5, in which a sun gear 150 drives the planet gear 129.

Thus, FIG. 5 illustrates that orbiting and rotation of the compound planet gear 129 causes a change in pitch when the fixed ring gear 126 is stationary. FIG. 6 illustrates a system for inducing this orbiting.

FIG. 6: SUN GEAR 150 CAUSES PLANET GEAR 129 TO ORBIT, CAUSING PITCH CHANGE

In FIG. 6, a sun gear 150 is added to the components of FIG. 5. The sun gear 150 drives the sub-planet 129A, causing the orbiting 135 of planet gear 129. Thus, rotation of the sun gear 150 causes pitch change by causing relative rotation of ring gears 103 and 126.

Conversely, in order to keep pitch constant, ring gears 103 and 126 must not rotate with respect to each other. Consequently, planet gear 129 must not rotate about its axis 156. If planet gear 129 is non-rotating, then the sun gear 150 must be non-rotating.

Stated in other words, in order to maintain pitch fixed, reference marks 160 and 160A on the sun gear 150 and the fixed ring gear 126 must remain fixed with respect to each other. The significance of this lack of relative rotation will become apparent, as FIG. 7 is examined.

Figure 7:
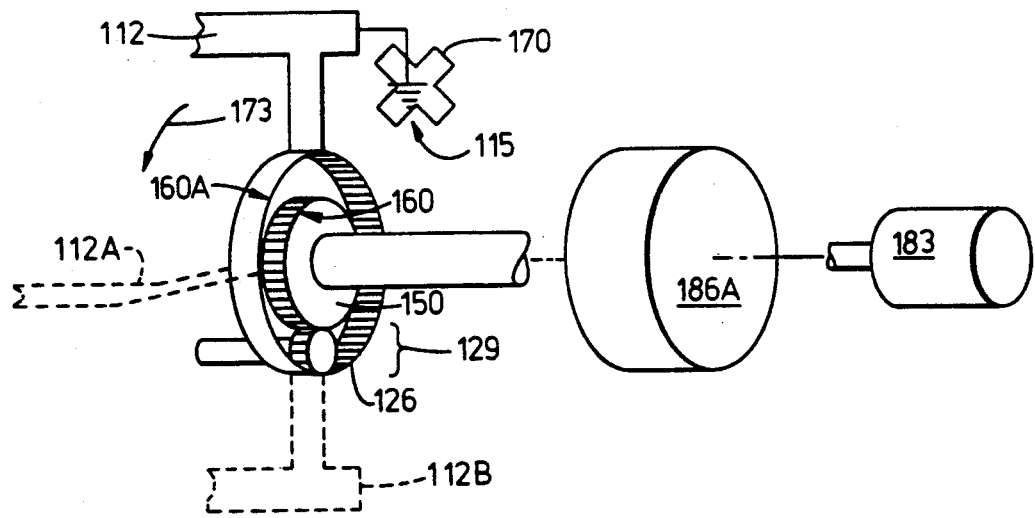
FIG. 7 illustrates a problem which arises when fixed ring gear 126 in FIG. 6 is affixed to turbine 18 in FIG. 2: a stationary motor 183, in order to rotate sun gear 150, must transmit torque across a rotating obstacle 186A, which represents component 40 in FIG. 2.

FIG. 7: FIXED GEAR 126 NOW ROTATES WITH PROPELLER 6. SUN GEAR 150 MUST BE KEPT SYNCHRONOUS WITH FIXED GEAR 126 FOR CONSTANT PITCH

In FIG. 7, propeller rotation will be considered. (In contrast, in FIGS. 4-6, propeller rotation was absent.) During propeller rotation, bracket 112 of FIG. 6 is no longer stationary, as indicated by the cross 170 in FIG. 7 which covers the ground symbol 115. Instead, both the bracket 112 and the blade 6 (not shown in FIG. 7) rotate in direction 173, and bracket 112 successively occupies positions 112, 112A, and then 112B. (The components of located to the left of arrows 7—7 in FIG. 6 are eliminated in FIG. 7 for simplicity.)

In FIG. 7, if pitch is to remain fixed, then alignment marks 160 and 160A must be kept aligned. However, in FIG. 7, unlike the case of FIG. 6, alignment mark 160A rotates along with rotating bracket 112, and so the other mark 160 must keep up with it. That is, the speed of sun gear 150 be kept equal to that of fixed ring gear 126. (Ring gear 126 is now "fixed" in the sense that it does not rotate with respect to bracket 112; it rotates along with bracket 112). Restated, sun gear 150 must be kept synchronous with fixed ring gear 126 for pitch to remain fixed.

Figure 1:
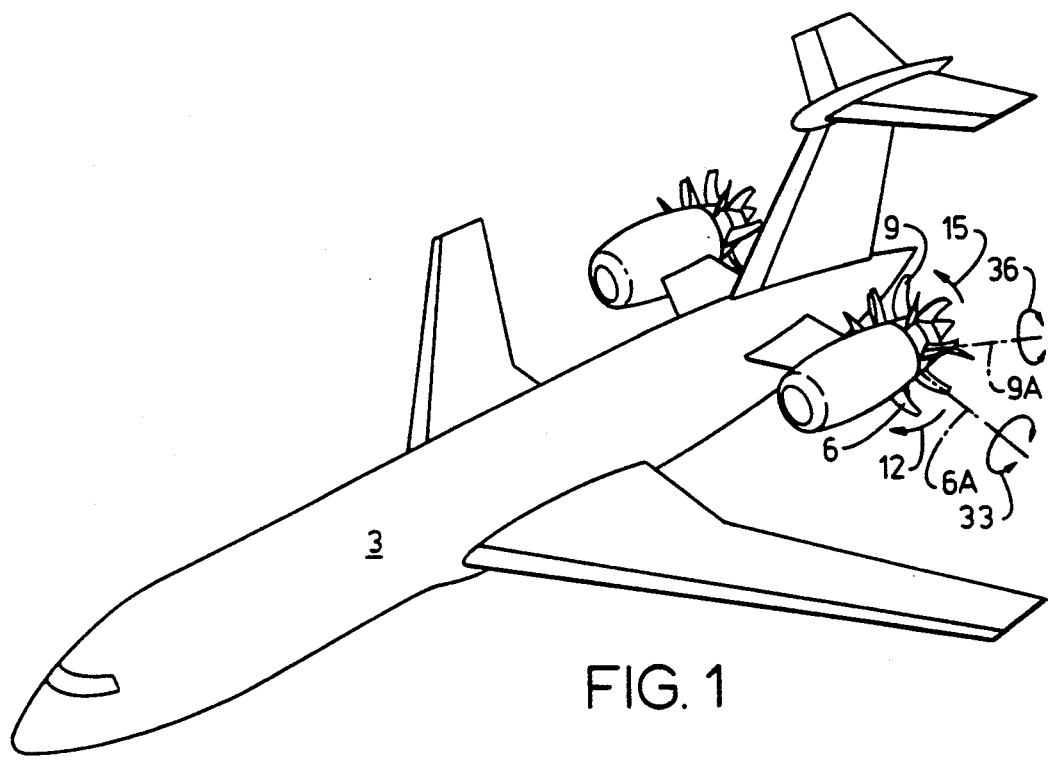
FIG. 1 illustrates an aircraft powered by counterrotating propellers which can use the present invention in changing blade pitch.
Figure 2:
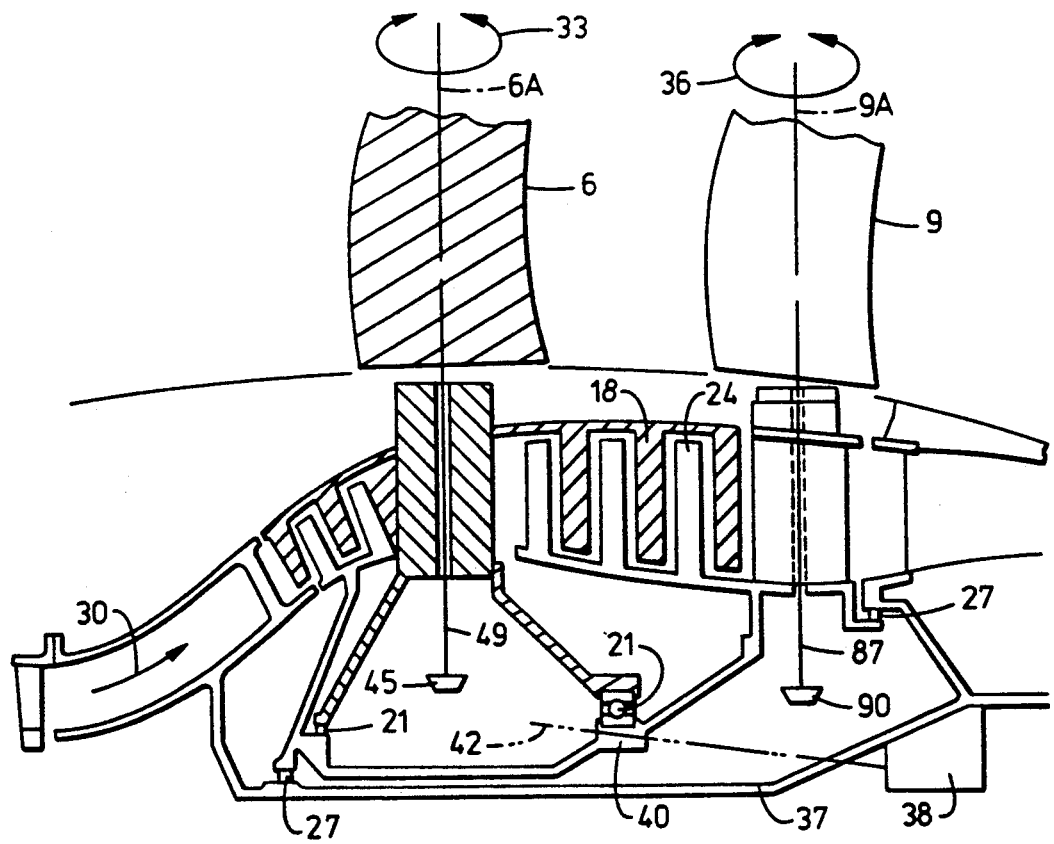
FIG. 2 is a schematic cross section of part of the engine of FIG. 1.
Figure 3:
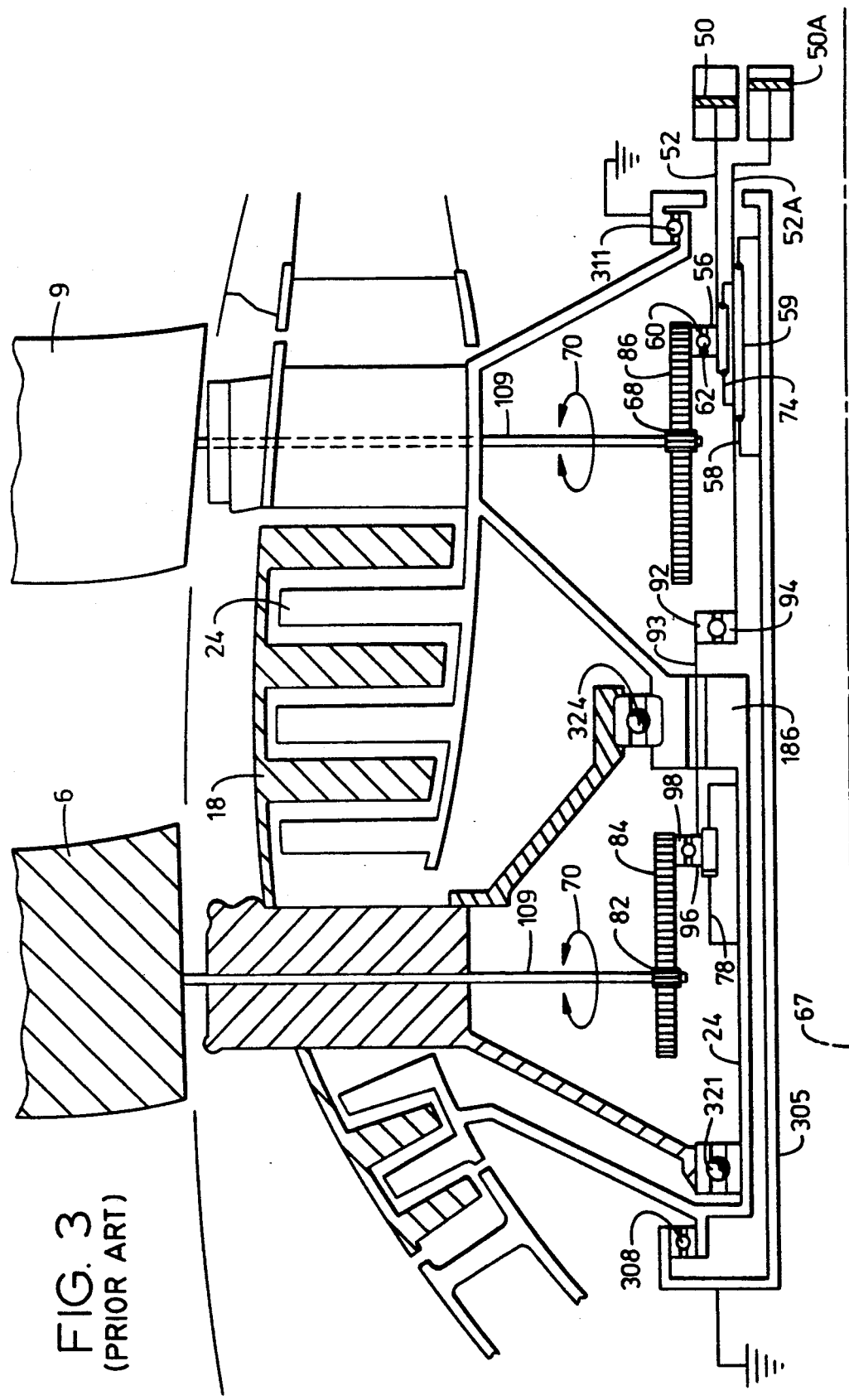
FIG. 3 illustrates a prior approach to changing pitch in the system of FIG. 2.

When the pitch-change system of FIGS. 6 and 7 is used with the propulsion system of FIG. 2, the following problems arise: (1) how to transmit power from a stationary motor 38 in FIG. 2, across the rotating frame 40, to sun gear 150 in FIG. 7, as discussed in the Background of the Invention, and (2) how to keep the sun gear 150 synchronous with the rotating "fixed" ring gear 126.

(It is recognized that sun gear 150 will not always be synchronous with fixed ring gear 126, and that non-synchronicity will occur when pitch changes. However, the following discussion is framed in terms of synchrony in order to more clearly explain the gear trains involved. Nonsynchronous rotation will be discussed later.)

Figure 8:
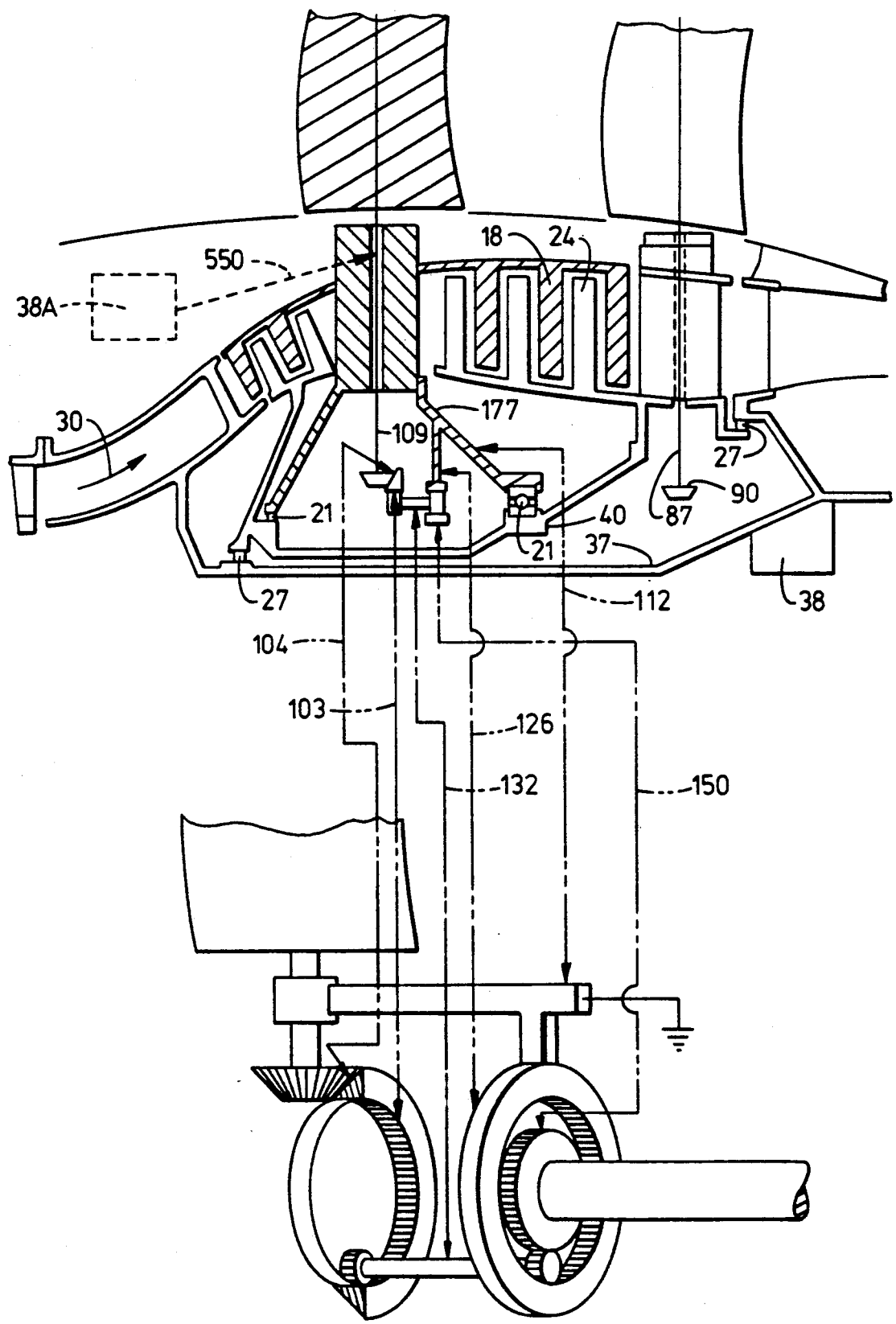
FIG. 8 illustrates the gear system of FIG. 6, when installed in a turbine system of FIG. 2.

FIGS. 6 AND 8: HOW TO DRIVE SUN GEAR 150 WHEN ROTATING FRAME 40 SEPARATES MOTOR 38 FROM SUN GEAR 150

A system of the type shown in FIG. 6 is shown in cross-section in FIG. 8, and installed in a turbine of the type shown in FIG. 2. A small reproduction of FIG. 6 is included in FIG. 8, with arrows pointing between analogous components, for ease of identification. For example, in FIG. 8, bracket 112 of FIG. 6 takes the form of turbine frame 177, which carries turbine 18.

In FIG. 8, the sun gear 150 is to be driven by a motor 38 which is supported by non-rotating support 37 and located near the aft end of the engine. With this configuration, torque must be transmitted to sun gear 150 across a rotating barrier 40, which takes the form of the frame supporting the turbine 24. (It is desirable to position the motor 38 near the aft end of the engine for ease of access for maintenance.) The rotating frame 40 may be viewed as a rotating barrier 186A in FIG. 7.

Figure 9:
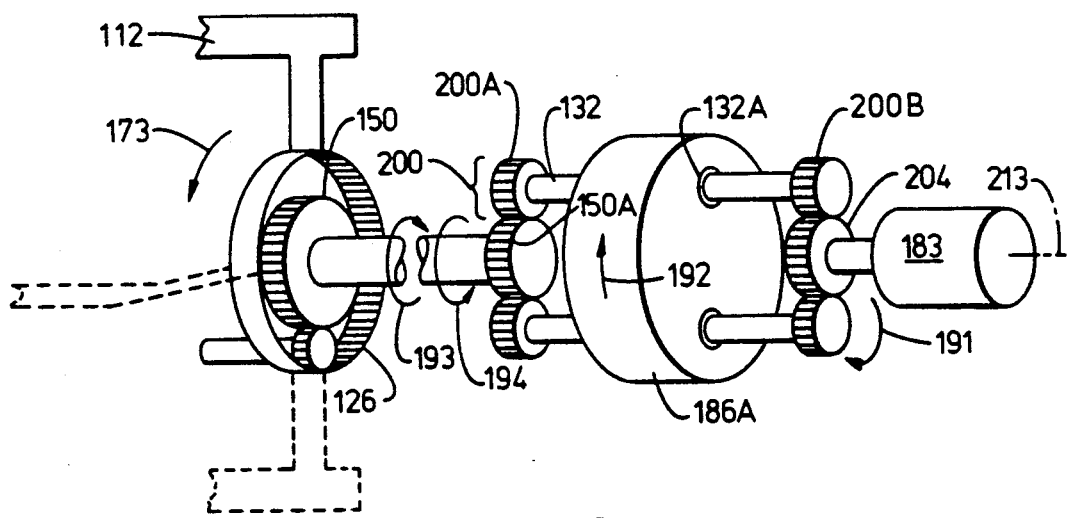
FIG. 9 is a modification of FIG. 7, in which obstacle 186A acts as a carrier for planets 200, which transmit torque across the rotating obstacle 186A.
Figure 9A:
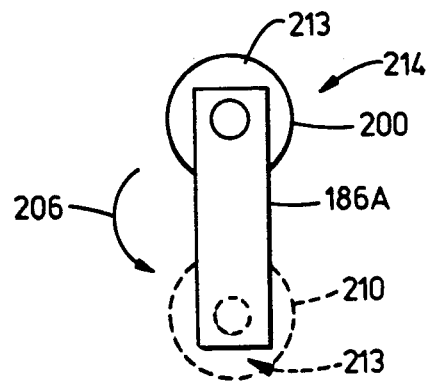
FIG. 9A illustrates the fact that, even though planet 200 is fixed with respect to carrier 186A, rotation of the carrier can be viewed as causing rotation of the planet 200.

FIG. 9: THE INVENTION USES ROTATING BARRIER 186A AS A PLANET CARRIER TO TRANSMIT TORQUE FROM MOTOR 183 TO SUN GEAR 150

The invention transmits the pitch-change torque across the rotating barrier-frame 186A in FIG. 9 by using the frame 186A as a carrier for planet gears 200. The shafts 132 in FIG. 6 of the planets 200 are journaled through holes 132A in FIG. 9 in the frame 186A. The frame acts as a planet gear carrier, as that term is used in the gear art. The sub-planets 200A and 200B are identical in numbers of teeth and pitch diameter, so that the planet 200 acts as an idler gear.

Recapitulation

Restated, (1) the frame 186A reacts only the load of planet gears 200, as does a planet carrier, but (2) the speed of revolution of the sun gear 150 (which is driven by the planet gears 200) is independent of both (i) the rotational speed of the planets 200 and (ii) the rotational speed of the frame-carrier 186A. Rotation of an added second sun gear 204 in FIG. 9 causes rotation of the planets 200. Rotation of the carrier 186A has no effect on the first sun gear 150.

In other words, the driven sun gear 150A will always assume the speed of the driving sun gear 204, regardless of the rotation of the planet carrier 186A. The speed of the planets 200 in direction 191 depends on the carrier speed. However, the carrier speed does not affect the speed of the sun gear 150A.

As stated above, the pitch-change motion can be induced by rotation of the sun gear 150 relative to the ring gear 126, which is fixed to the rotating turbine frame 112. In FIG. 9, the motor 183 has no information about the speed of the fixed ring gear 126. Such information is necessary to adjust the pitch independently of the speed of the turbine frame 112.

Figure 10:
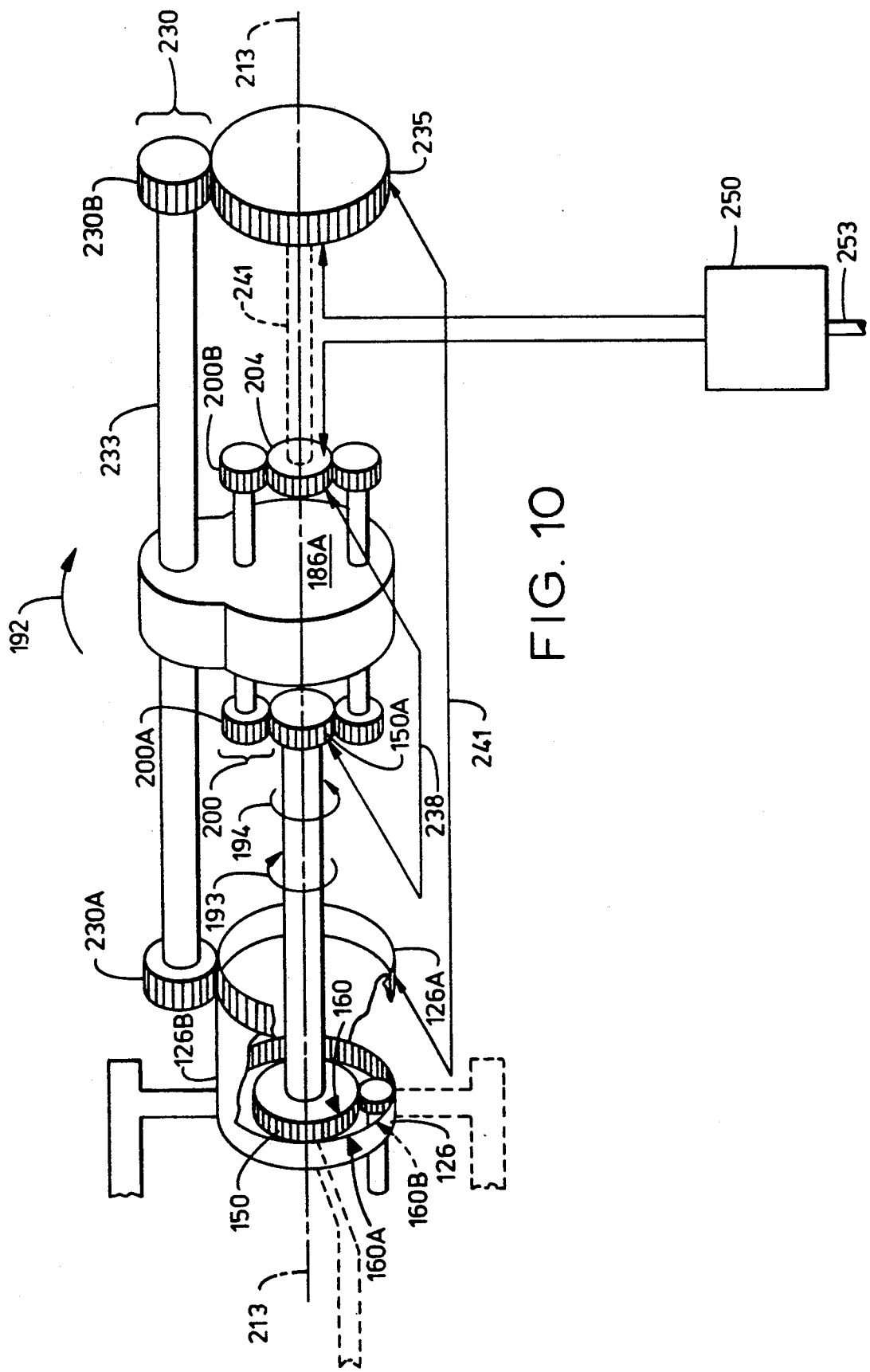
FIG. 10 is a modification of FIG. 9, in which the rotating obstacle 186A carries another planet gear 230, which is used to synchronize sun gear 150 with fixed ring gear 126. Planet 230 carries speed information of turbine 18.

Introduction to FIG. 10

Figure 12:
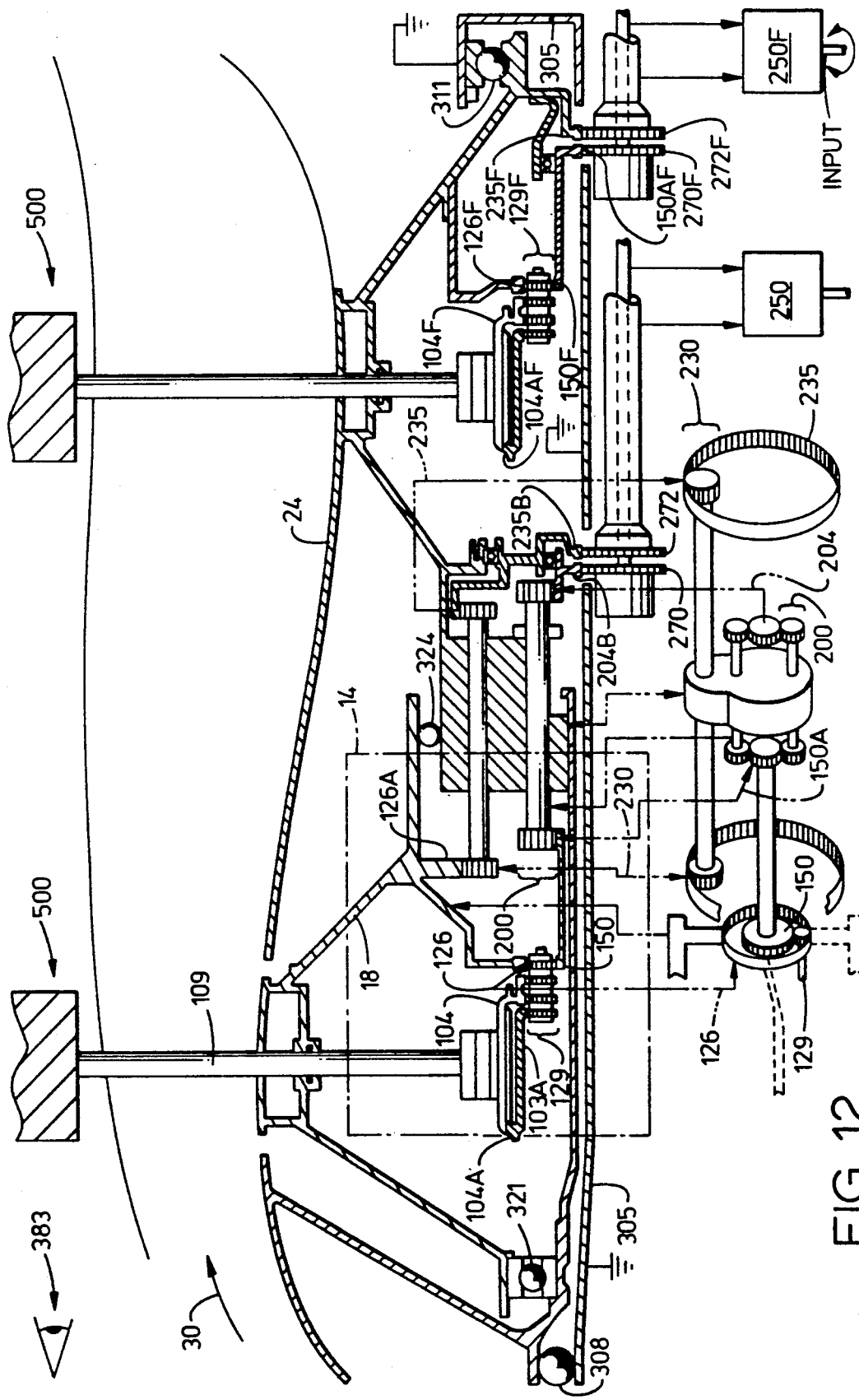
FIG. 12 illustrates one form of the invention installed in a counterrotating turbine system.
Figure 13:
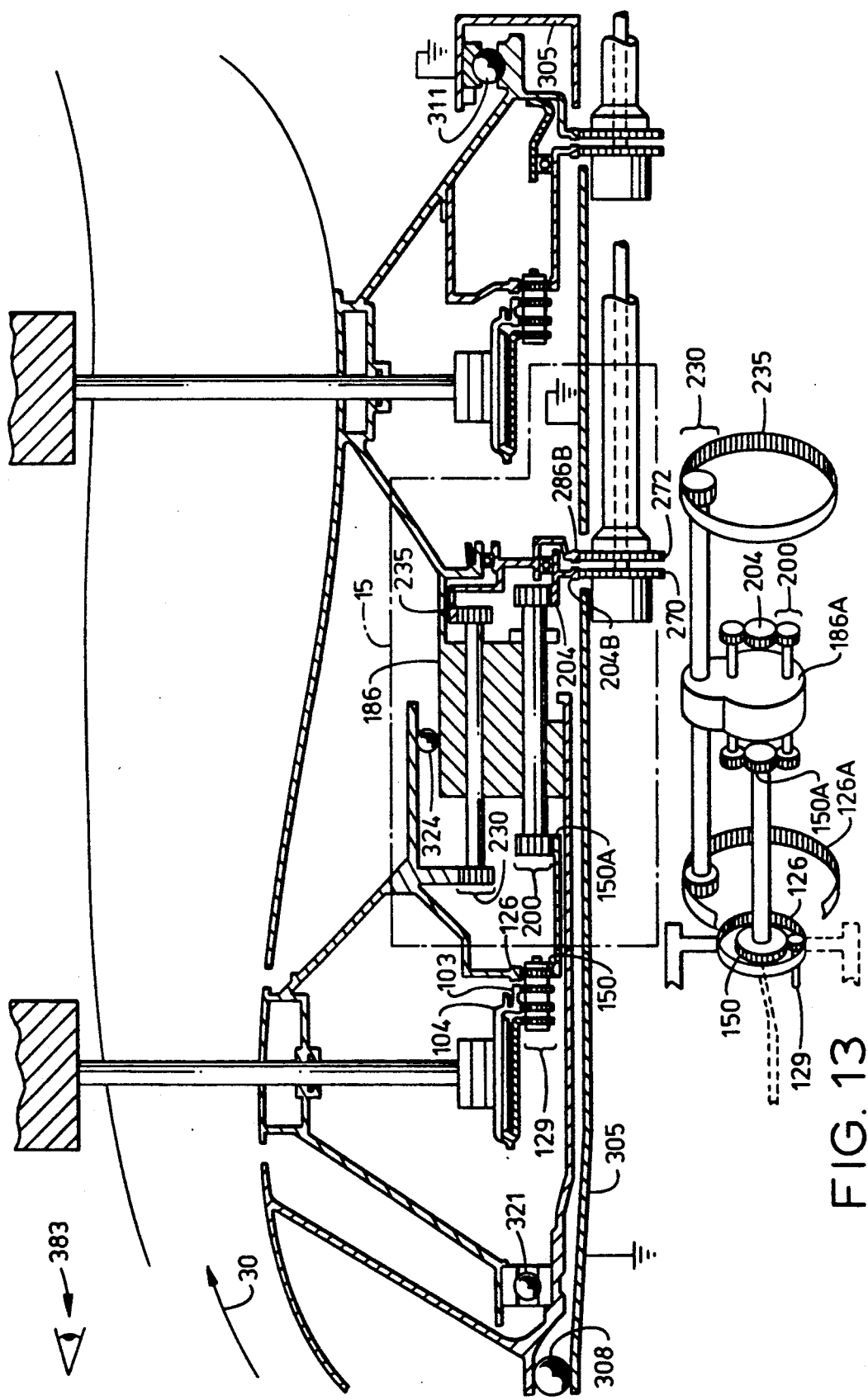
FIG. 13 illustrates a simplified form of FIG. 12.

Such information is provided in FIG. 10 by means of a speed reference gear train comprising: the fixed gear 126A, shown as a sun gear in FIG. 10, but replaced with an internal ring gear in FIGS. 12 and 13; planet 230; and sun gear 235, which is also replaced with an internal ring gear in FIGS. 12 and 13. As in the case of the driving planet 200, the reference planet 230 consists of the planet gears 230A and 230B of the same pitch diameter and same numbers of teeth. The identical nature of the sub-planets 230A and 230B makes planet 230 function as an idler planet, and the speed of the sun gear 235 will always be the same as the speed of the fixed gear 126A, independent of the speed and rotational direction of the carrier 186A.

With the arrangement of FIG. 10, the pitch can be changed by rotating the sun gear 204 relative to the gear 235, which results in rotating the sun gear 150 relative to the gear 126A. The speed of the gears 150 and 204 is the same as that of the gear 126A during the time that pitch remains fixed. The rotation of the penetrated obstacle 186A has no effect on the above speeds and pitch change. However, it affects the speed of the idler planets 200 and 230. The differential 250 allows changing the relative speed of the gears 204 and 235 by using a stationary motor. The motor rotation is in a single direction, but the speed can change, causing changes in the speed of the gear 204, resulting in initiation of relative rotation between gears 204 and 235 and subsequent pitch change.

Therefore, torque is transmitted across the rotating frame 186A by using the frame 186A as a planet carrier. However, as stated above, to keep pitch fixed, the first sun gear 150 must be kept synchronous with the fixed ring gear 126. A means for accomplishing the synchronicity will now be discussed.

FIG. 10: RELATIVE MOTION BETWEEN SUN GEARS 204 AND 235 CAUSES PITCH CHANGE

The preceding discussion has been simplified to facilitate explanation. For example, sun gears 204 and 235 are shown as being locked together on shaft 241, and, consequently, they rotate at the same speed. However, in fact, these sun gears rotate at the same speed only when pitch is to remain fixed. Further, shaft 241 is not used, but, instead, the locking is performed by a differential 250, known in the art.

The differential 250 has the characteristics of, first, rotating sun 204 relative to the gear 235, depending on the direction of rotation of the input shaft 253. For example, clockwise rotation of input shaft 253 will cause sun 204 to accelerate while the speed of the sun 235 remains constant (determined only by the speed of the turbine frame 112). The two suns now rotate relative to each other, but in the same absolute direction. As another example, counterclockwise rotation of input shaft 253 causes the opposite effect: sun 204 decelerates. As a third example, when input shaft 253 is fixed, the sun 204 is required to rotate at the same speed as the sun 235.

Figure 11:
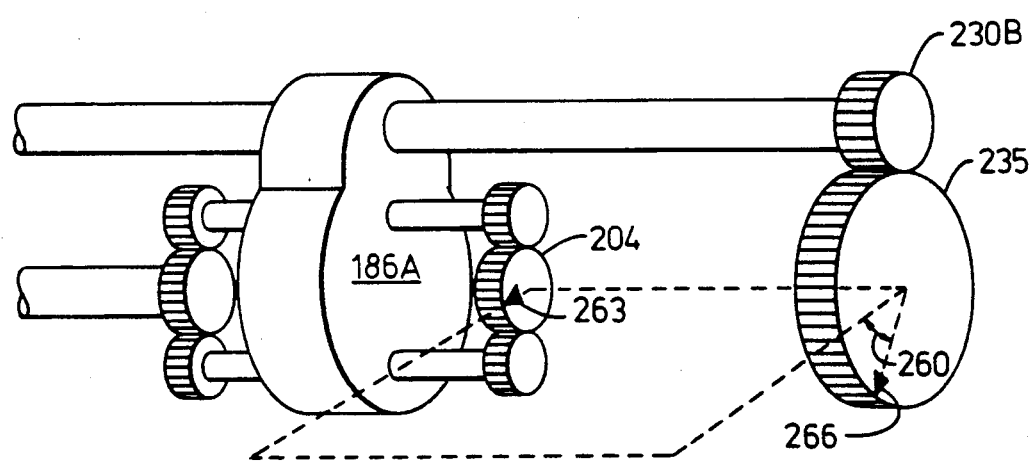
FIG. 11 illustrates a definition of the term "phase" between sun gears 204 and 235.

Therefore, differential 250 selectively keeps sun gears 204 and 235 in synchrony, and selectively changes relative phase between them, in order to change pitch. Phase can be defined by the angle 260 in FIG. 11 made between reference marks 263 and 266 on the sun gears.

The preceding discussion has explained a simplified form of the invention wherein pitch-changing torque is transmitted through a rotating frame 186A and, further, wherein a gear train maintains pitch fixed despite changes in speed between the frame 186A and a fixed ring gear 126 (which is attached to a second rotating frame, taking the form of turbine 18 in FIG. 2). This discussion will now explain a more complex form of the invention.

FIGS. 12 AND 13: MORE COMPLEX FORM OF THE INVENTION

The invention will now be explained in greater detail, with reference to FIGS. 12 and 13. A small reproduction of a schematic identical to a portion of FIG. 10, except that sun gears 126A and 235 have been replaced with internal ring gears, is contained in FIGS. 12 and 13 for reference, with lines connecting analogous components in FIG. 12. FIG. 13 resembles FIG. 12, but with the connecting lines deleted for clarity.

In FIGS. 12 and 13, flow path 30 corresponds to flow path 30 in FIG. 2. In FIGS. 12 and 13, the support system for the turbines is shown differently than in FIG. 2, because the former FIG. 2 is a schematic. In FIGS. 12 and 13, turbine stage 24 in FIG. 10 is supported on a stationary frame 305 by bearings 308 and 311 and rotates, for example, clockwise when seen by eye 383.

The first turbine stage 18 is supported by bearings 321 and 324, and rotates in the opposite direction. The first turbine 18 is nested upon the second turbine 24: the first turbine 18 is wholly supported by a rotating element, namely, turbine 24, and by no stationary component, such as stationary frame 305.

The operation of the gear system in FIGS. 12 and 13 is as described in connection with FIG. 10, with the following exceptions which do not impact the overall principles of operation as described previously in conjunction with FIG. 10; added gears are present in FIGS. 12 and 13 which drive the gears of FIG. 10; as noted previously, the sun gears 126A and 235 of FIG. 10 are replaced with internal ring gears. As to the added gears, an added internal ring gear 204B is attached to sun gear 204, and an added internal ring gear 235B is attached to the ring gear 235, which replaces sun gear 235 of FIG. 10. These internal ring gears are driven by pinions 270 and 272. The differential 250 in FIG. 10 connects directly to pinions 270 and 272, and not as shown in FIG. 10 where it connects directly to sun gears 204 and 235 The interconnection of pinions 270 and 272 and internal rings 204B and 235B between the differential 250 and sun gear 204 and internal ring gear 235 does not change the overall principles of operation described above.

Gears 126A and 235 in FIG. 12 must both be the same: they can either have teeth on their radially outward faces, with the same pitch diameters. In such a case, they would be termed sun gears. Alternately, they can have teeth on their radially inward faces, with the same pitch diameters, wherein they would be termed internal ring gears. Greater detail of the system in FIGS. 12 and 13 is given in FIGS. 14 and 15, which show the respective regions bounded by the L-shaped corners labeled "14" and "15" in FIGS. 12 and 13.

An invention has been described wherein a pitch-change torque is transmitted across a rotating frame 186A to propeller blades 6, and in which changes in speed of the rotating frame 186A do not cause changes in pitch.

SIGNIFICANT FEATURES

Figure 14:
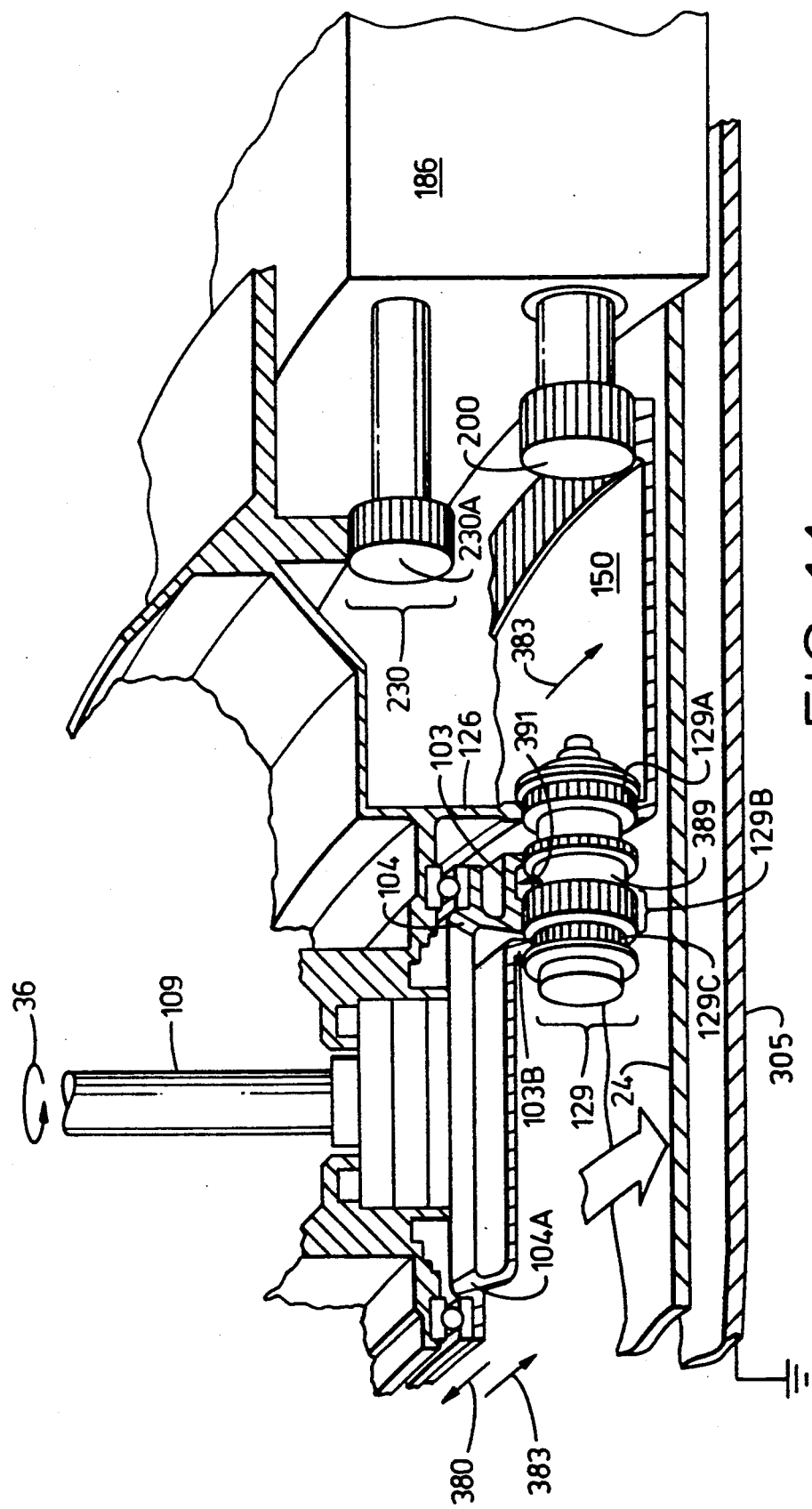
FIG. 14 illustrates region 14 of FIG. 12.
Figure 15:
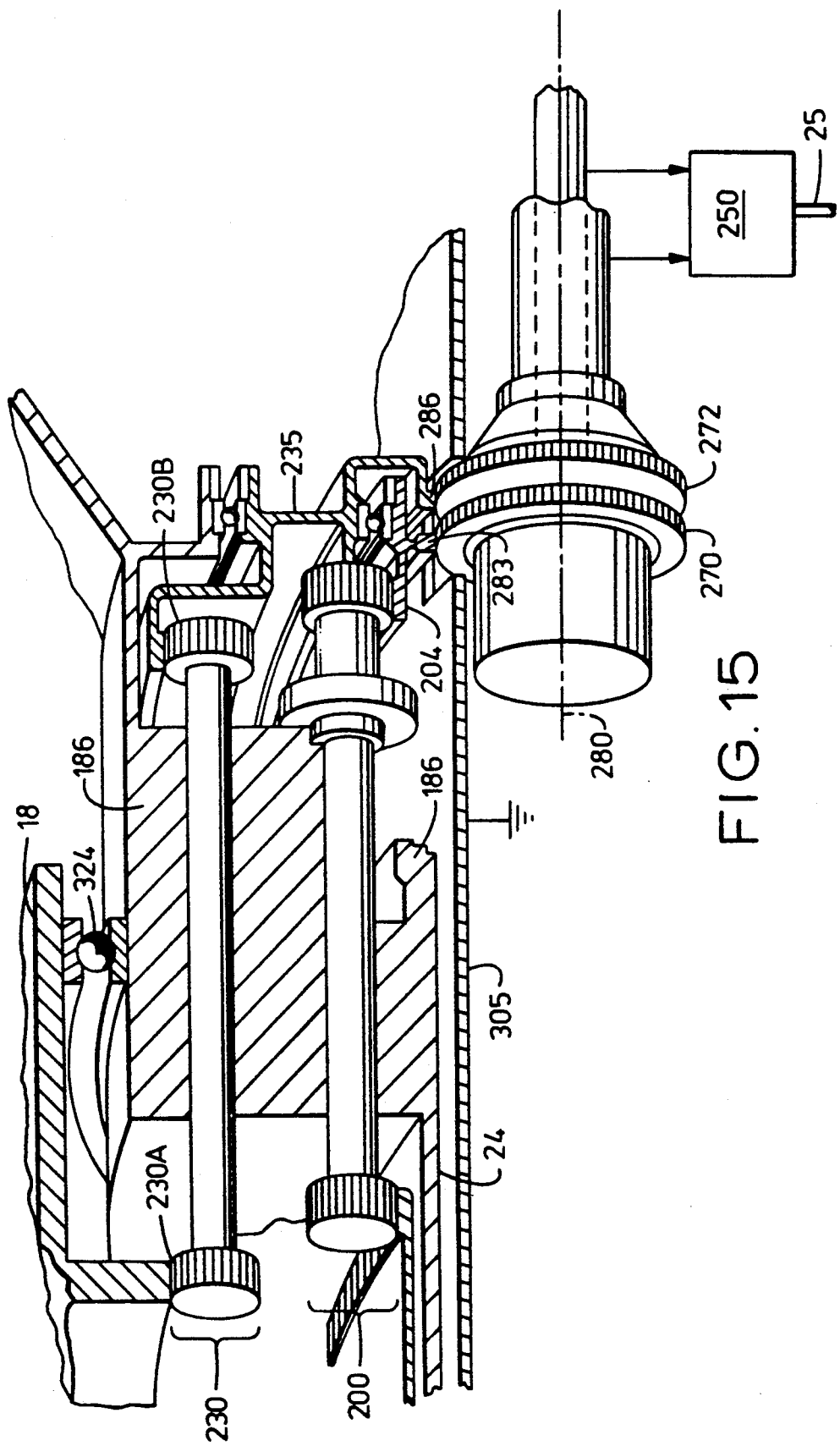
FIG. 15 illustrates region 15 of FIG. 13.

Several significant features of the invention are the following. One, in another embodiment, an added movable ring gear 103B in FIG. 14 is driven by sub-planet 129C, which is fastened to planet 129. The gear ratio between sub-planet 129C and second movable ring gear 103B is different than the ratio between sub-planet 129B and movable ring gear 103, thus causing relative rotation between the two ring gears 103 and 103B, and inducing pitch change through bevel gears 104 and 104A.

Restated, during pitch change, movable ring gear 103 moves in one direction, such as direction 380 in FIG. 14, with respect to fixed ring gear 126. At the same time, second movable ring gear 103B moves in the opposite direction 383 with respect to fixed ring gear 126.

Two, the preceding discussion has considered the pitch change mechanism of the forward propeller. The pitch change mechanism for the aft propeller 9 is substantially identical, except that no frame-carrier 186A is present. In FIG. 12, components 104F, 104AF, 126F, 129F, 150F, and 235F correspond in function to respective components 104, 104A, 126, 129, 150, and 235. For the aft propeller 9, the pitch-changing operation is identical to that of the forward propeller 6, with the exception that planets 200 are not used, because they are not necessary to cross rotating frame 186A.

A differential 250F, analogous to differential 250, both of which are shown in FIG. 12, maintains a constant angular difference between gears 104F and 150F in order to maintain pitch constant, just as reference marks 160 and 160A must be kept aligned in FIG. 7 for constant pitch.

Three, the discussion above has implied that shaft 109 in FIGS. 8 and 12 directly drives the propeller blades 6. It may be desirable in some situations to add a torque multiplier 500 in FIG. 12 in order to give the shaft 109 a torque advantage over the blade. Such an advantage would allow a shaft of smaller diameter to be used.

Figure 21:
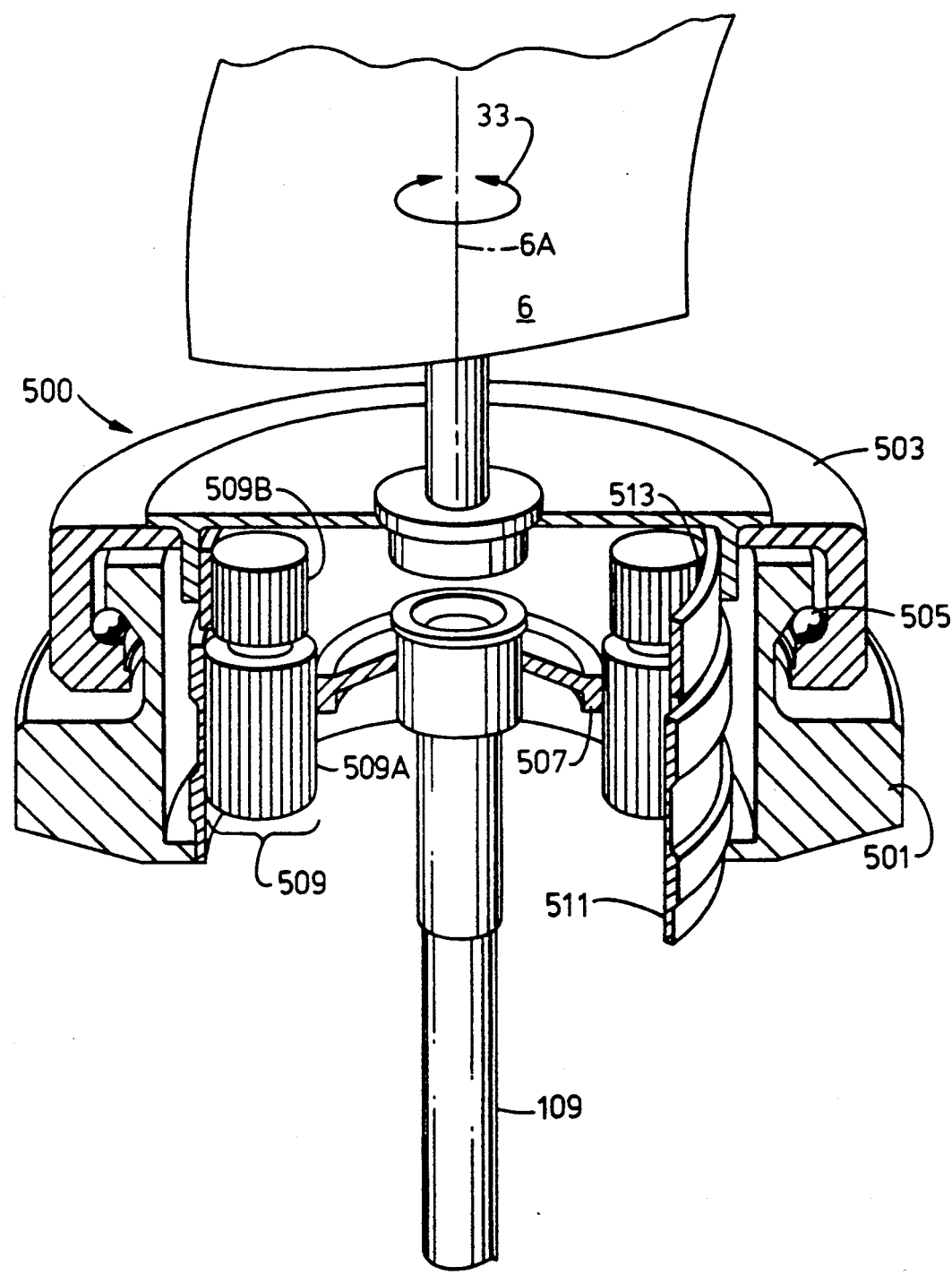
FIG. 21 illustrates a torque multiplier 500 in FIG. 12 which gives shaft 109 a torque advantage over blade 6.

One type of torque multiplier is shown in FIG. 21. A trunnion 503 carries the blade 6, and is carried by carrier 501 through bearings 505. The bearing arrangement allows trunnion 503 and blade 6 to rotate about pitch axis 6A. Carrier 501 is affixed to, and synchronous with, the rotating frame 18 in FIG. 12 in a manner which is not shown.

One type of carrier 501 is illustrated in U.S. Pat. No. 4,863,352, entitled "Blade Carrying Means," by Hauser, et al., of which the General Electric Company is the Assignee and which is hereby incorporated by reference.

A sun gear 507 is carried by shaft 109 and drives compound planets 509. Sub-planet 509A engages a ring gear 511 which is affixed to the carrier 501. Sub-planet 509B engages a ring gear 513 which is attached to the trunnion 503. The gear ratio between sub-planet 509A and ring gear 511 is different than that between sub-planet 509B and ring gear 513. Consequently, rotation of sun gear 507 causes trunnion 503 to rotate with respect to carrier 501, for reasons which are explained in the section entitled "Technical Considerations," located below. Shaft 109 is thus given a mechanical advantage over blade 6.

Four, planet 230 in FIGS. 10 and 12 can be viewed as providing a signal which indicates the speed of turbine 18. If planet 230 were non-existent, the required speed of planet 200 would not be known, because the speed of turbine 18 would not be known: turbine 18 is hidden from view because it is nested upon turbine 24.

Of course, with other gear ratios, equal speeds of planets 230 and 200 may not be required, but, instead, a known speed ratio would be required.

Five, in the arrangement of FIG. 8, all direct paths (meaning generally straight-line paths) from motor 38 to shaft 109 are blocked by the rotating frame 40. In theory, a transmission system following path 550 could be used. However, numerous technical objections exist to such an approach, including the problems associated with crossing a rotary interface at very high circumferential speed. A problem also exists with crossing the hot gas stream 30. The requirement of such a crossing gives another definition of "direct:" a path is not direct if it must cross the hot gas stream 30.

Six. The invention can be viewed as producing two pitch-changing torques and then transmitting one of the torques across a rotating obstacle affixed to turbine 24 to the propeller of the other turbine 18, nested upon turbine 24.

Technical Considerations

Figure 16:
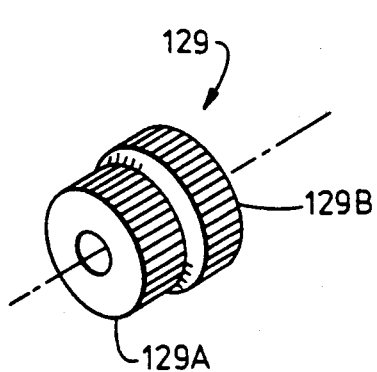
FIG. 16 illustrates a compound planet gear.

FIG. 16 illustrates a compound planet gear 129, of the type shown in FIG. 5, having a large diameter sub-planet 129B attached to a smaller diameter sub-planet 129A. The compound planet 129 is driven by a sun gear 150 in FIG. 17, and engages a pair of inner and outer ring gears 103 and 126, as in FIG. 5, the latter ring gear being larger in diameter than the former, and being restrained against rotation as indicated by ground symbol 115.

Figure 17:
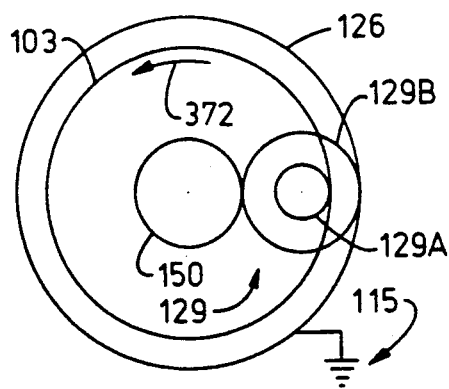
FIG. 17 schematically illustrates gears 103, 103A, 150 and planet 129 in FIG. 12.

When sun gear 150 in FIG. 17 rotates, the compound planet 129 rotates and causes relative rotation of the ring gear 103 to the fixed ring gear 126, as indicated by arrow 372. The reason for the relative rotation can be explained with reference to FIG. 18.

Figure 18:
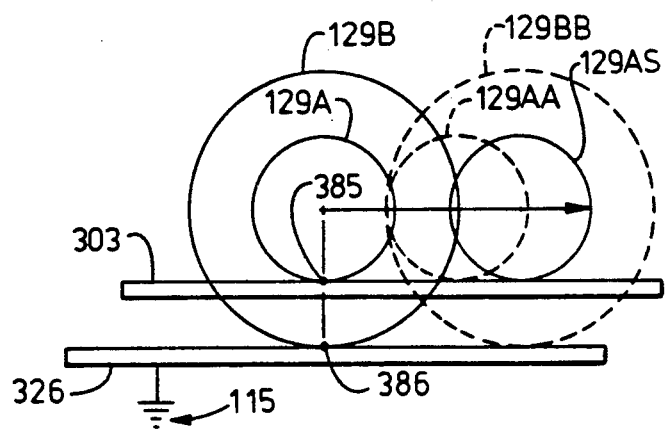
FIGS. 18, 19, and 20 illustrate the gear system of FIG. 17, but with gears 103 and 103A having infinite radii for ease of explanation.

In FIG. 18, ring gears 103 and 126 in FIG. 17 are shown as flat surfaces 303 and 326. That is, in FIG. 18, the ring gears are shown as having infinite diameters. Let it first be assumed that sub-planets 129A and 129B are not connected as shown in FIG. 16, but can rotate independently. If both subplanets rotate ¼ revolution to the right, then they will reach the phantom positions 129AA and 129BB. However, since they are fastened together, contrary to the assumption, the small sub-planet 129A is forced to remain concentric with the large sub-planet 129B, and occupies solid position 129AS.

Since there is no slippage between sub-planets and ring gears, the ring gear 303 is now forced to move to the right with respect to ring gear 326. That is, ring gears 303 and 326 move in opposite directions with respect to each other.

Figure 19:
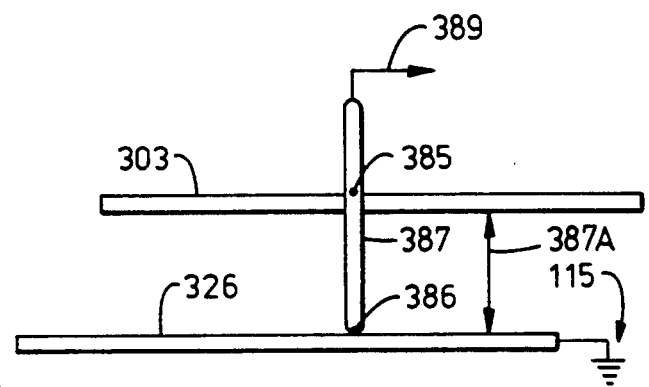

This relative, differential, motion can be explained in a different manner by reference to FIG. 19. Tangent points 385 and 386 in FIG. 18 are shown in FIG. 19 and are viewed as pivot points at which a lever 387 is fastened to the surfaces 303 and 326. If the lever is pulled to the right by force 389, surface 303 is driven to the right with respect to surface 326.

The preceding discussion has explained that motion of the compound planet 129 in FIG. 17 induces a relative rotation of the ring gear 103 to the ring gear 126. In addition, as will now be explained in connection with FIG. 20, a mechanical advantage can be obtained by planet 129 in FIG. 17 over the ring gear 103.

Figure 20:
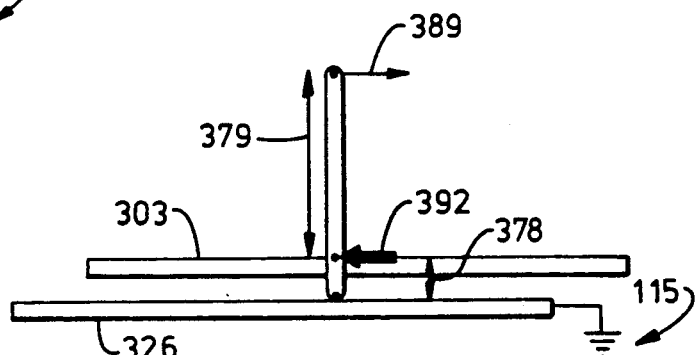

FIG. 20 shows a different separation 378 between the surfaces 303 and 326, as compared with the separation 378A in FIG. 19. In FIG. 20, force 389 has a mechanical advantage over the resisting force 392 (assuming that surface 126 does not move as indicated by ground symbol 115), and the magnitude of the advantage is the ratio of (distance 379+distance 378)/(distance 378).

Restated, the ratio shows that when distance 378 becomes smaller (ie, the closer are ring gears 103 and 126 in FIG. 17 to having the same diameter), the mechanical advantage of sun gear 150 (which is analogous in action to force 389 in FIG. 20) becomes larger.

Therefore, it has been shown that when ring gears 103 and 126 in FIG. 17 have different tooth numbers (ie, different diameters) as do sub-planets 129A and 129B, rotation of the sub-planets causes opposite, differential, rotation of the ring gears. Further, the gears can be toothed such that the planets 129 and sun gear 150 have a mechanical advantage over the ring gears 103 and 103B in FIG. 14, and thus the planets have a mechanical advantage over the propeller blades.

Numerous substitutions and combinations can be undertaken without departing from the true spirit and scope of the invention. What is desired to be secured by Letters Patent is the invention as defined in the following claims.

I claim:
1. An aircraft propulsion system comprising:
   a) a first turbine carrying a first set of propeller blades;
   b) a second turbine carrying a second set of propeller blades;

c) a gear system carried by the first turbine for changing pitch of the first set of propeller blades, which includes
  i) a pair of ring gears, both coaxial with the first turbine, one (103) of which is movable with respect to the first turbine and links to the first set of propeller blades, and one (126) of which is fixed with respect to the first turbine;
  ii) a first set of planet gears (129) which engage both ring gears and which induce pitch change when the planet gears rotate;
  iii) a sun gear (150) which drives the planet gears;
d) a second set of planet gears (200) which are carried by a planet gear carrier (186) affixed to the second turbine and which drive the sun gear in order to change pitch by causing relative motion between the sung ear and the first turbine; and
e) means for preventing a change in speed of the planet gear carrier from causing a change in pitch.

2. In a pair of counterrotating aircraft propellers, in which all direct paths between a pitch-change motor and a first propeller of the pair are blocked by a rotating obstacle, the improvement comprising:
a) means for independently changing pitch of each propeller; and
b) means for transmitting pitch-change forces from the motor, through the rotating obstacle, sand to the first propeller in such a manner as to prevent changes in speed of either the first or second propellers form changing pitch of the first propeller, wherein said transmitting means comprises:
  i) a speed reference gear train including
    A) a firs ring gear fixed relative to the first propeller and positioned forward of the rotating obstacle,
    B) a second ring gear, located aft of the rotating obstacle, and
    C) a first set of planet gears, each including a shaft which is journaled through holes in the rotating obstacle, each engaging said first ring gear with a forward gear mesh, and each engaging said second ring gear with an aft gear mesh, each mesh comprising the same number of gear teeth and the same pitch diameter, thereby causing said first planet gears to function as idler gears which in turn causes said second ring gear to be synchronous with the first propeller;
  ii) a first sun gear, located aft of the rotating obstacle,
  iii) a second sun gear, located forward of the rotating obstacle and linked to the first propeller;
  iv) a second set of planet gears, each including a shaft journaled through holes in the rotating obstacle, each engaging said first sun gear with aft gear mesh, and each engaging said second sun gear with a forward gear mesh, each mesh comprising the same number of gear teeth and the same pitch diameter, thereby causing said second planet gears to function as idler gears; and
  v) differential means linked to said first sun gear and said second ring gear causing said first and second sun gears to rotate relative to said second ring gear in order to change pitch of the first propeller.

3. In an aircraft propulsion system which includes a first turbine riding on a second turbine and carrying a first propeller, the second turbine riding on a stationary support and carrying a second propeller, the improvement comprising:
a) a rotating obstacle affixed to the second turbine and separating the first and second turbines;
b) means for producing first and second pitch-change torques, said means located aft of said rotating obstacle;
c) a sun gear and a ring gear, each located aft of said rotating obstacle;
d) differential means for applying said first pitch-change torque to said sun gear such that said sun gear rotates relative to said ring gear, creating a phase angle between said sun gear and said ring gear, in order to change pitch of the first propeller;
e) means for transmitting said first pitch-change torque through said rotating obstacle to said first turbine; and
f) first and second means for applying the pitch-change torques to the respective propellers for changing pitch, wherein said first applying means includes said sun gear, said ring gear and said differential means.

4. An aircraft propulsion system comprising:
a) a first turbine carrying a first set of propeller blades;
b) a second turbine and carrying a second set of propeller blades;
c) a first gear system carried by the first turbine, for changing pitch of the first set of propeller blades, which includes
  i) a pair of ring gears (103, 126), both coaxial with the first turbine, one of which
    A) is movable with respect to the first turbine and
    B) links to the first set of propeller blades, and one of which is fixed with respect to the first turbine;
  ii) a first set of planet gears (129) which engage both ring gears in the pair and which induce pitch change by rotation;
  iii) a sun gear (150) which rotates the planet gears;
d) a second set of planet gears (200) which are carried by a planet gear carried affixed to the second turbine and which drive the sun gear in order to cause a change in pitch by causing relative motion between the sun gear and the first turbine, wherein rotational and orbital speeds of the second set of planet gears have no affect on rotational speed of the sun gear;
e) a third set of planet gears (230) which are carried by the planet gear carried affixed to the second turbine and which engage a ring gear (126A) affixed to the first turbine, wherein the third set of planet gears provides a speed reference of the first turbine independent of the rotational and orbital speeds of the third set of planet gears; and
f) differential means connected to the first and second planet gears for
  i) maintaining alignment between the movable ring gear (103) and the fixed ring gear (126) of the first gear system; and
  ii) selectively misaligning the movable ring gear of the first gear system and the fixed ring gear for changing pitch.

5. A system according to claim 4 wherein said second turbine:
a) is carried by bearings upon a stationary support;

b) carries bearings upon which the first turbine rotates; and c) rotates opposite to the first turbine.

6. A system according to claim 5 and further comprising:

a second gear system carried by the second turbine for changing pitch of the second propeller.

7. A system according to claim 6 in which all gears of the first and second gear systems rotate, orbit, or both rotate and orbit during normal propeller operation.

* * * * *